(12) United States Patent
Tahara et al.

(10) Patent No.: US 8,181,447 B2
(45) Date of Patent: May 22, 2012

(54) EXHAUST GAS PURIFICATION DEVICE

(75) Inventors: Jun Tahara, Toyota (JP); Masaaki Kobayashi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1010 days.

(21) Appl. No.: 12/065,237

(22) PCT Filed: Aug. 28, 2006

(86) PCT No.: PCT/JP2006/317392
§ 371 (c)(1),
(2), (4) Date: Feb. 28, 2008

(87) PCT Pub. No.: WO2007/026904
PCT Pub. Date: Mar. 8, 2007

(65) Prior Publication Data
US 2009/0301063 A1    Dec. 10, 2009

(30) Foreign Application Priority Data
Sep. 2, 2005   (JP) .................................. 2005-255138

(51) Int. Cl.
*F01N 3/00* (2006.01)
*F01N 3/10* (2006.01)

(52) U.S. Cl. ................. 60/286; 60/295; 60/301; 60/303

(58) Field of Classification Search ..................... 60/285, 60/286, 295, 301, 303
See application file for complete search history.

(56) References Cited

U.S. PATENT DOCUMENTS

| | | | | |
|---|---|---|---|---|
| 5,537,321 A * | 7/1996 | Yoshizaki et al. | ............... | 701/99 |
| 5,842,341 A * | 12/1998 | Kibe | ............... | 60/274 |
| 6,119,448 A | 9/2000 | Emmerling et al. | | |
| 2003/0041845 A1* | 3/2003 | Akao et al. | ............... | 123/568.16 |
| 2004/0074225 A1* | 4/2004 | Schaller et al. | ............... | 60/274 |
| 2004/0226284 A1* | 11/2004 | Kitahara et al. | ............... | 60/285 |
| 2004/0244362 A1 | 12/2004 | Hiranuma et al. | | |
| 2005/0076635 A1* | 4/2005 | Suyama et al. | ............... | 60/276 |

FOREIGN PATENT DOCUMENTS
EP    0 822 323 A1    2/1998
(Continued)

OTHER PUBLICATIONS

Omichi et al., English Abstract of JP 2003-201836 A, Jul. 18, 2003.*
Omichi et al., Machine Translation of JP 2003-201836 A, Jul. 18, 2003.*

*Primary Examiner* — Thomas Denion
*Assistant Examiner* — Audrey K Bradley
(74) *Attorney, Agent, or Firm* — Sughrue Mion, PLLC

(57) ABSTRACT

An ECU corrects a fuel addition interval, based on an amount of change between an exhaust gas temperature at present and a basic exhaust gas temperature obtained when a basic addition interval is set, to reduce the fuel addition interval with an increase in the amount of change in the exhaust gas temperature. With such correction of the addition interval, when the exhaust gas temperature is increased in a highland region or the like, the fuel addition interval is corrected to be reduced and an fuel addition amount is corrected to be increased according to the increase in the exhaust gas temperature. Thereby, an increase in a temperature at a tip portion of a fuel addition valve can be suppressed, and thus clogging of an ejection hole of the fuel addition valve with deposits can be avoided.

6 Claims, 5 Drawing Sheets

FOREIGN PATENT DOCUMENTS

| | | |
|---|---|---|
| EP | 0 898 061 A2 | 2/1999 |
| EP | 1 033 480 A1 | 9/2000 |
| JP | 51837 U | 1/1993 |
| JP | 8270435 A | 10/1996 |
| JP | 200159417 A | 3/2001 |
| JP | 2003201836 A * | 7/2003 |
| JP | 2003222019 A | 8/2003 |
| JP | 2003307151 A | 10/2003 |

* cited by examiner

F I G. 1
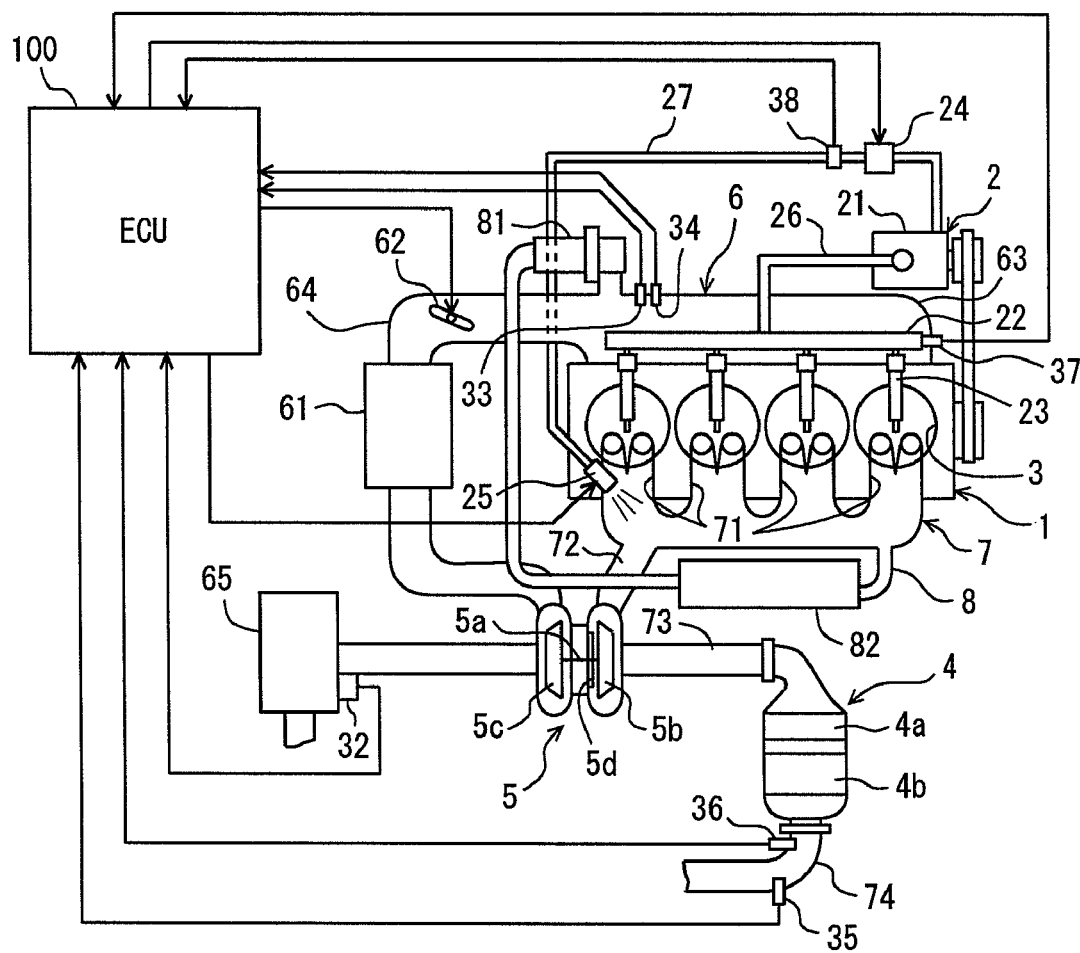

EXHAUST GAS PURIFICATION DEVICE

TECHNICAL FIELD

The present invention relates to a device purifying exhaust gas of an internal combustion engine with a catalyst, and more specifically, to an exhaust gas purification device having a fuel addition valve adding fuel to an exhaust path.

BACKGROUND ART

Generally, in an internal combustion engine performing lean combustion such as a diesel engine, an operation region in which an air-fuel mixture with a high air-fuel ratio (in a lean atmosphere) is combusted accounts for a large percentage of an entire operation region. Therefore, an exhaust path of the engine of this type is provided with a nitrogen oxide (hereinafter referred to as NOx) occlusion agent (an NOx occlusion catalyst) for occluding (absorbing) NOx contained in exhaust gas to purify the exhaust gas.

When the amount of NOx occluded in such an NOx occlusion catalyst reaches saturation, it is necessary to reduce NOx and restore the NOx occlusion catalyst. To reduce NOx, NOx reduction treatment is performed by adding an NOx reducing agent (fuel such as light oil) to the upstream of the NOx occlusion catalyst provided in the exhaust path, thermally decomposing the fuel to generate hydrocarbon, and using the generated hydrocarbon as a reducing agent to accelerate reduction of NOx.

Further, the exhaust gas of a diesel engine contains particulates (hereinafter referred to as PM (Particulate Matter)), soot, an SOF (Soluble Organic Fraction), and the like mainly composed of carbon, which are the causes of air pollution. As a device to remove such PM and the like, there has been known an exhaust gas purification device having a particulate filter provided in an exhaust path of a diesel engine for trapping PM contained in exhaust gas passing through the exhaust path to reduce the amount of emission released to the atmosphere. As a particulate filter, a DPF (Diesel Particulate Filter) or a DPNR (Diesel Particulate-NOx Reduction system) catalyst is used, for example.

When PM is trapped with a particulate filter and the trapped PM is deposited thereon in large amount to clog the particulate filter, pressure loss in the exhaust gas passing through the particulate filter is increased and accordingly an engine exhaust backpressure is increased, causing a reduction in engine output and fuel efficiency. To solve such a problem, PM regeneration treatment is performed by adding fuel to the exhaust path (upstream of the particulate filter) to increase an exhaust gas temperature and thereby accelerate oxidation (combustion) of the PM on the particulate filter.

As described above, in the NOx reduction treatment and the PM regeneration treatment performed to suppress deterioration of an exhaust gas purifying function of a catalyst, the exhaust path is provided with a fuel addition valve to supply fuel (a reducing agent) into the exhaust path. However, since an ejection hole of the fuel addition valve is exposed in the exhaust path, substances such as soot and an SOF contained in the exhaust gas adhere to and are deposited on the ejection hole of the fuel addition valve. Then, the adhering and deposited substances are exposed to the exhaust gas with a high temperature, altered and solidified to become deposits, thus causing clogging of the ejection hole of the fuel addition valve. As a method of preventing such clogging of the fuel addition valve, there has been proposed a method of decreasing a temperature at a tip of the fuel addition valve by forcibly performing fuel addition (hereinafter referred to as "anti-clogging addition") at a timing other than that of adding fuel during NOx reduction and PM regeneration (see for example Japanese Patent Laying-Open No. 2003-222019).

Anti-clogging addition control is performed by predetermining an addition interval using an engine revolution number and an addition amount as parameters, and controlling opening/closing of the fuel addition valve based on the predetermined addition interval. However, when an engine is operated in a highland region or the like, an intake air volume is smaller than that in a flatland region, causing an increase in an exhaust gas temperature. When an environmental change (a change in atmospheric pressure) causes an increase in the exhaust gas temperature as described above, fuel addition control based on a predetermined addition interval may not be able to maintain a temperature at a tip of the fuel addition valve at not more than a predetermined value (i.e., a temperature at which production of deposits can be suppressed), and an ejection hole of the fuel addition valve may be clogged.

DISCLOSURE OF THE INVENTION

The present invention has been made in view of the above circumstances, and one object of the present invention is to provide an exhaust gas purification device capable of suppressing clogging of a fuel addition valve adding fuel to an exhaust path despite a change in an exhaust gas temperature of an internal combustion engine due to an environmental change such as a change in atmospheric pressure.

The present invention provides an exhaust gas purification device having a catalyst provided in an exhaust path of an internal combustion engine and a fuel addition valve adding fuel to the exhaust path, characterized in that an addition amount of the fuel to be added to the exhaust path is corrected based on an exhaust gas temperature. Specifically, the exhaust gas purification device is characterized in that an addition amount of the fuel to be added to the exhaust path is corrected by multiplying a basic addition interval or a basic addition time period by a correction coefficient according to an exhaust gas temperature.

According to the present invention, when the exhaust gas temperature is increased in a highland region or the like, a fuel addition amount can be increased according to the increase in the exhaust gas temperature, for example by correcting an fuel addition interval. Accordingly, an increase in a temperature at a tip portion of the fuel addition valve can be suppressed. Thereby, the temperature at the tip of the fuel addition valve can be maintained at not more than a predetermined value (i.e., a temperature at which production of deposits can be suppressed), and thus clogging of an ejection hole of the fuel addition valve with the deposits can be avoided.

In the present invention, the exhaust gas temperature used for correcting the addition amount may be a value estimated from parameters such as an engine revolution number, an intake air temperature, and the atmospheric pressure. The exhaust gas temperature may also be obtained from an output of an exhaust gas temperature sensor provided for detecting an exhaust gas temperature adjacent to a place where the fuel addition valve is provided (for example, an exhaust gas temperature upstream of a turbo charger).

According to the present invention, clogging of the fuel addition valve adding fuel to the exhaust path can be suppressed despite a change in the exhaust gas temperature of an internal combustion engine due to an environmental change such as a change in atmospheric pressure.

BRIEF DESCRIPTION OF THE DRAWINGS

FIG. 1 is a schematic structural view showing an exemplary diesel engine to which the present invention is applied.

BEST MODE FOR CARRYING OUT THE INVENTION

Figure 2:
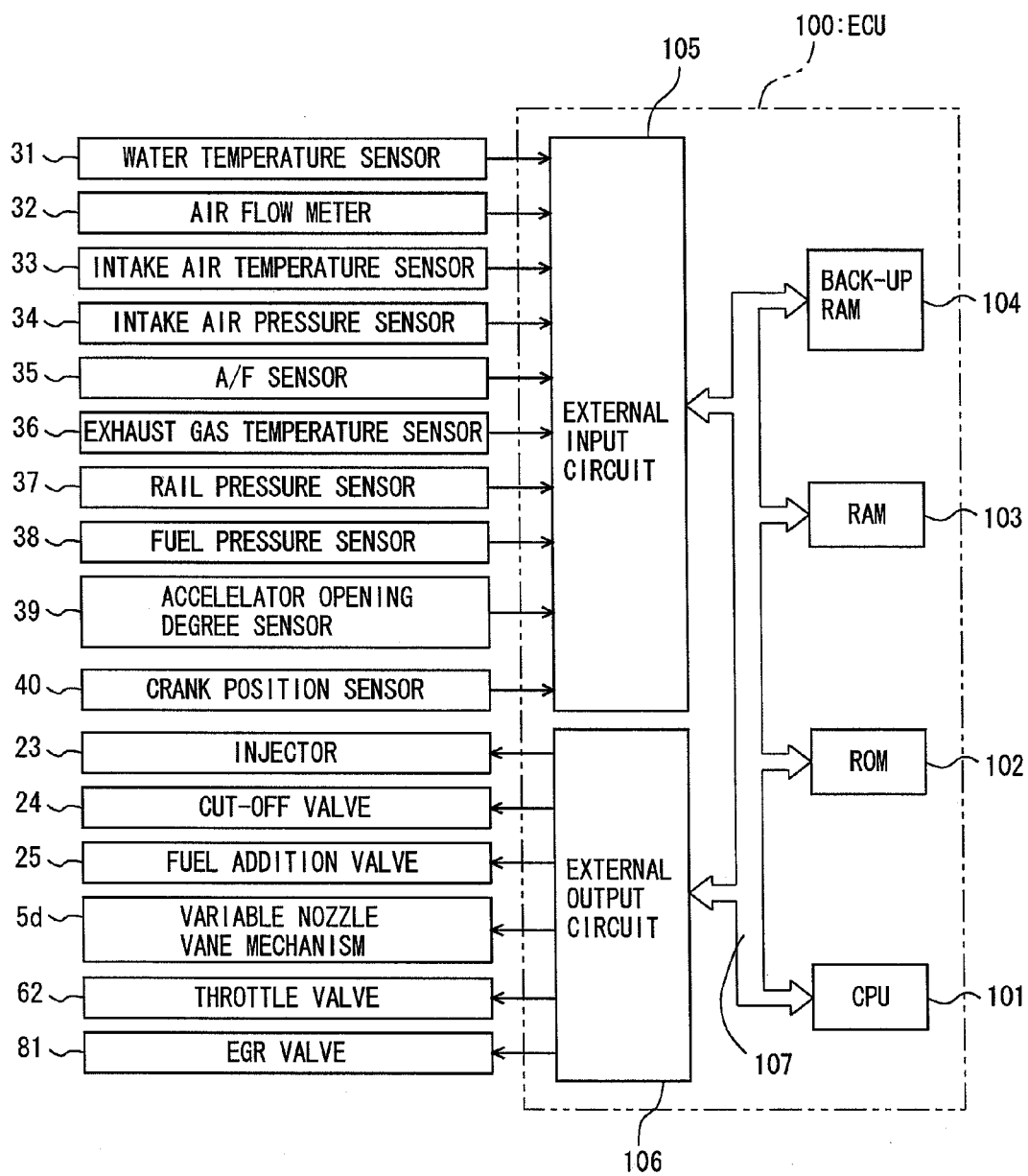
FIG. 2 is a block diagram showing a structure of a control system such as an ECU (Electronic Control Unit).

In the following, embodiments of the present invention will be described with reference to the drawings.

Engine

Referring to FIG. 1, a schematic structure of a diesel engine to which a fuel addition device of the present invention is applied will be described.

A diesel engine 1 (hereinafter referred to as an "engine 1") of this example is for example a common-rail type in-cylinder direct injection four-cylinder engine including main components such as a fuel supply system 2, a combustion chamber 3, an intake system 6, and an exhaust system 7.

Fuel supply system 2 includes a supply pump 21, a common rail 22, an injector (fuel injection valve) 23, a cut-off valve 24, a fuel addition valve 25, an engine fuel path 26, an added fuel path 27, and the like.

Supply pump 21 draws fuel from a fuel tank, increases the pressure of the drawn fuel to a high pressure, and then supplies the fuel to common rail 22 through engine fuel path 26. Common rail 22 has a function as an accumulation chamber maintaining (accumulating) the high pressure fuel supplied from supply pump 21 at a predetermined pressure, and distributes the accumulated fuel to each injector 23. Injector 23 is an electromagnetically driven open/close valve that opens when a predetermined voltage is applied and injects the fuel into combustion chamber 3 for supply.

Supply pump 21 also supplies a portion of the fuel drawn from the fuel tank to fuel addition valve 25 through added fuel path 27. Fuel addition valve 25 is an electromagnetically driven open/close valve that opens when a predetermined voltage is applied and adds the fuel to exhaust system 7 (ranging from an exhaust port 71 to an exhaust manifold 72). Cut-off valve 24 cuts off added fuel path 27 to stop fuel supply in case of emergency.

Intake system 6 includes an intake manifold 63 connected to an intake port formed in a cylinder head. An intake pipe 64 constituting an intake path is connected to intake manifold 63. The intake path is provided with an air cleaner 65, an air flow meter 32, and a throttle valve 62 arranged in this order from upstream. Air flow meter 32 outputs an electrical signal according to a volume of air flowing into the intake path through air cleaner 65.

Exhaust system 7 includes exhaust manifold 72 connected to exhaust port 71 formed in the cylinder head. Exhaust pipes 73 and 74 constituting an exhaust path are connected to exhaust manifold 72. The exhaust path is provided with a catalyst device 4.

Catalyst device 4 includes an NOx occlusion-reduction catalyst 4a and a DPNR catalyst 4b. NOx occlusion-reduction catalyst 4a occludes NOx when exhaust gas contains a large amount of oxygen, and reduces NOx to $NO_2$ or NO and releases $NO_2$ or NO when the exhaust gas has a low oxygen concentration and contains a large amount of a reduction component (for example, an unburned component (HC) of the fuel). NOx released as $NO_2$ or NO quickly reacts with HC and CO in the exhaust gas and is further reduced to $N_2$. HC and CO themselves are oxidized by reducing $NO_2$ or NO, and becomes $H_2O$ and $CO_2$.

DPNR catalyst 4b is formed for example by incorporating an NOx occlusion-reduction catalyst into a porous ceramic structure. PM contained in the exhaust gas is trapped by DPNR catalyst 4b when passing through a porous wall. When the exhaust gas has a lean air-fuel ratio, NOx in the exhaust gas is occluded in the NOx occlusion-reduction catalyst, and when the exhaust gas has a rich air-fuel ratio, the occluded NOx is reduced and released. DPNR catalyst 4b also includes a catalyst oxidizing and combusting the trapped PM (for example, an oxidation catalyst mainly composed of a noble metal such as platinum).

Catalyst device 4, fuel addition valve 25, added fuel path 27, and cut-off valve 24 described above, an ECU (Electronic Control Unit) 100 controlling opening/closing of fuel addition valve 25, and the like constitute an exhaust gas purification device.

Engine 1 is provided with a turbo charger (supercharger) 5. Turbo charger 5 includes a turbine wheel 5b and a compressor wheel 5c coupled via a turbine shaft 5a. Compressor wheel 5c is disposed to face the inside of intake pipe 64, and turbine wheel 5b is disposed to face the inside of exhaust pipe 73. Turbo charger 5 with such a structure supercharges intake air by rotating compressor wheel 5c with an exhaust gas flow (exhaust gas pressure) received by turbine wheel 5b. Turbo charger 5 of this example is a variable nozzle turbo charger, and has a variable nozzle vane mechanism 5d provided on a side adjacent to turbine wheel 5b. The supercharging pressure of engine 1 can be adjusted by adjusting an opening degree of variable nozzle vane mechanism 5d.

Intake pipe 64 of intake system 6 is provided with an intercooler 61 for forcibly cooling the intake air warmed up by the supercharging at turbo charger 5. Throttle valve 62 is provided further downstream of intercooler 61. Throttle valve 62 is an electronically controlled open/close valve with a continuously adjustable opening degree, and has a function of narrowing the area of a flow path for the intake air under a predetermined condition and adjusting (reducing) a supply amount of the intake air.

Engine 1 is further provided with an EGR path (exhaust gas recirculation path) 8 connecting intake system 6 with exhaust system 7. EGR path 8 returns a portion of the exhaust gas back to intake system 6 as appropriate and supplies it again to combustion chamber 3 to decrease a combustion temperature, thereby reducing an NOx generation amount. EGR path 8 is provided with an EGR valve 81 and an EGR cooler 82 for cooling the exhaust gas passing (recirculating) through EGR path 8. An EGR volume (exhaust gas recirculation volume) to be introduced from exhaust system 7 to intake system 6 can be adjusted by adjusting an opening degree of EGR valve 81.

Sensors

Various sensors are attached to individual parts of engine 1 to output signals according to ambient conditions of the individual parts and operation states of engine 1.

For example, air flow meter 32 outputs a detection signal according to a flow volume of the intake air (intake air volume) upstream of throttle valve 62 in intake system 6. An intake air temperature sensor 33 is disposed at intake manifold 63 to output a detection signal according to an intake air temperature. An intake air pressure sensor 34 is disposed at intake manifold 63 to output a detection signal according to an intake air pressure. An A/F (air-fuel ratio) sensor 35 outputs a detection signal that varies continuously according to an oxygen concentration in the exhaust gas downstream of catalyst device 4 in exhaust system 7. An exhaust gas temperature sensor 36 outputs a detection signal according to a temperature of the exhaust gas (exhaust gas temperature) downstream of catalyst device 4 in exhaust system 7. A rail pressure sensor 37 outputs a detection signal according to a pressure of the fuel accumulated in common rail 22. A fuel pressure sensor 38 outputs a detection signal according to a pressure of the fuel (fuel pressure) passing through added fuel path 27.

ECU

As shown in FIG. 2, ECU 100 includes a central processing unit (CPU) 101, a read-only memory (ROM) 102, a random access memory (RAM) 103, a back-up RAM 104, and the like. ROM 102 stores various control programs, maps that are referred to when such various control programs are executed, and the like. CPU 101 performs various operations based on the various control programs and maps stored in ROM 102. RAM 103 is a memory temporarily storing results of the operations in CPU 101, data input from the individual sensors, and the like. Back-up RAM 104 is a nonvolatile memory storing, for example, data and the like to be retained when engine 1 is stopped.

ROM 102, CPU 101, RAM 103, and back-up RAM 104 described above are connected with one another via a bus 107, and also connected with an external input circuit 105 and an external output circuit 106.

Air flow meter 32, intake air temperature sensor 33, intake air pressure sensor 34, A/F sensor 35, exhaust gas temperature sensor 36, rail pressure sensor 37, and fuel pressure sensor 38 described above are connected to external input circuit 105. Further, a water temperature sensor 31 outputting a detection signal according to a temperature of cooling water for engine 1, an accelerator opening degree sensor 39 outputting a detection signal according to an amount of depression of an accelerator pedal, a crank position sensor 40 outputting a detection signal (pulse) each time when an output axis (crank shaft) of engine 1 is rotated at a predetermined angle, and the like are connected to external input circuit 105. On the other hand, injector 23, cut-off valve 24, fuel addition valve 25, variable nozzle vane mechanism 5d, throttle valve 62, EGR valve 81, and the like are connected to external output circuit 106.

According to outputs of the various sensors described above, ECU 100 performs various controls of engine 1. ECU 100 also performs PM regeneration control and an addition interval correction process when performing anti-clogging addition control described below.

PM Regeneration Control

Firstly, ECU 100 estimates a PM deposition amount deposited in DPNR catalyst 4b. The PM deposition amount can be estimated, for example, by determining PM adhesion amounts according to respective operation states of engine 1 (for example, an exhaust gas temperature, a fuel injection amount, and an engine revolution number) through experiments and the like and mapping the determined PM adhesion amounts beforehand, and then summing the PM adhesion amounts obtained from the map to determine the PM deposition amount. The PM deposition amount can also be estimated according to a travel distance or time of a vehicle, or estimated by providing catalyst device 4 with a pressure difference sensor detecting a difference between a pressure upstream of DPNR catalyst 4b and a pressure downstream of DPNR catalyst 4b, and estimating the PM deposition amount trapped by DPNR catalyst 4b based on an output of the sensor.

When the estimated PM amount reaches not less than a predetermined reference value (deposition amount limit), ECU 100 determines that DPNR catalyst 4b should now be regenerated, and performs PM regeneration control. Specifically, ECU 100 calculates required fuel addition amount and addition interval with reference to a map prepared beforehand through experiments and the like based on the engine revolution number read from an output of crank position sensor 40, controls opening/closing of fuel addition valve 25 according to the calculation result, and intermittently repeats adding fuel to exhaust system 7. As a result of such fuel addition, a catalyst bed temperature of DPNR catalyst 4b is increased, and PM deposited in DPNR catalyst 4b is oxidized and released as $H_2O$ and $CO_2$.

In addition to the PM regeneration control described above, ECU 100 may perform S-poisoning recovery control and NOx reduction control. S-poisoning recovery control is a control that intermittently repeats adding fuel from fuel addition valve 25 to increase a catalyst bed temperature and make the air-fuel ratio of the exhaust gas stoichiometric or rich, thereby releasing a sulfur component from NOx occlusion-reduction catalyst 4a and the NOx occlusion-reduction catalyst in DPNR catalyst 4b. NOx reduction control is a control that reduces NOx occluded in NOx occlusion-reduction catalyst 4a and the NOx occlusion-reduction catalyst in DPNR catalyst 4b to $N_2$, $CO_2$, and $H_2O$ by intermittent fuel addition from fuel addition valve 25, and releases $N_2$, $CO_2$, and $H_2O$.

The PM regeneration control, the S-poisoning recovery control, and the NOx reduction control are respectively performed when requested. When these controls are simultaneously requested to be performed, they are preferentially performed in order of the PM regeneration control, the S-poisoning recovery control, and the NOx reduction control.

Addition Interval Correction Process

As described above, when an engine is operated in a highland region or the like, an intake air volume is smaller than that in a flatland region, causing an increase in an exhaust gas temperature. When an environmental change (a change in atmospheric pressure) causes an increase in the exhaust gas temperature as described above, anti-clogging addition control based on a predetermined addition interval may not be able to maintain a temperature at a tip of fuel addition valve 25 at not more than a predetermined value (i.e., a temperature at which production of deposits can be suppressed), and an ejection hole of the fuel addition valve may be clogged. To solve such a problem, the present embodiment has a characteristic that, when anti-clogging addition control is performed, the fuel addition interval is corrected according to a change in the exhaust gas temperature due to a change in atmospheric pressure to suppress an increase in the temperature at the tip portion of fuel addition valve 25.

Figure 3:
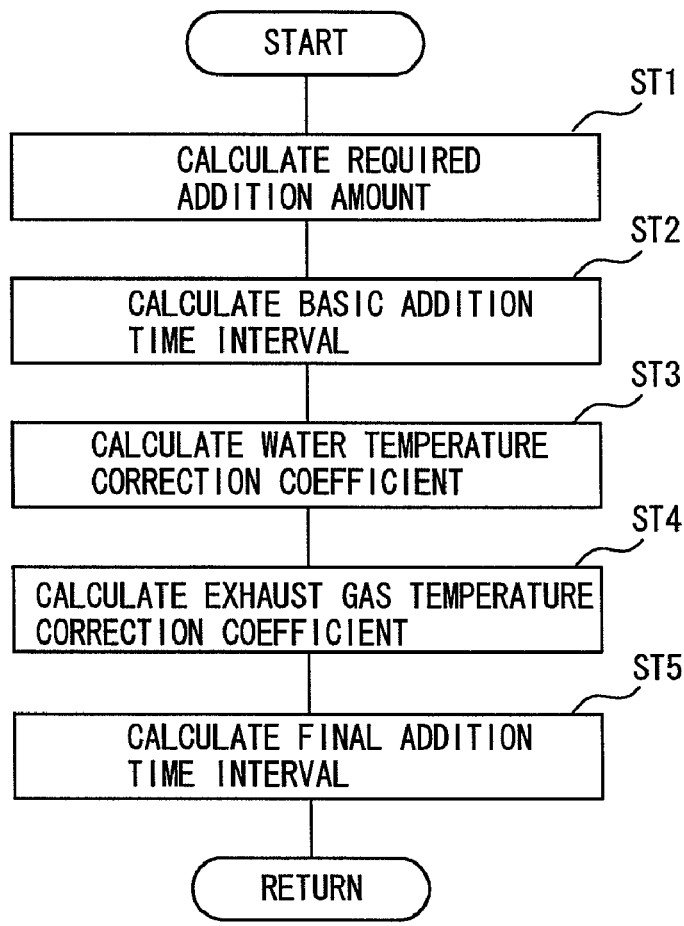
FIG. 3 is a flowchart illustrating an exemplary addition interval correction process performed by the ECU.

A specific example of the addition interval correction process will be described with reference to a flowchart of FIG. 3.

The addition interval correction process is performed by ECU 100. This correction process routine is repeatedly performed in a predetermined cycle.

Firstly, in step ST1, an engine revolution number Ne is read from the output of crank position sensor 40, and a required addition amount Q is calculated with reference to a map based on engine revolution number Ne. The map for calculating required addition amount Q is prepared by mapping the relation between engine revolution number Ne and required addition amount Q determined beforehand through experiments and calculations, and the map is stored beforehand in ROM 102 of ECU 100.

Figure 4:
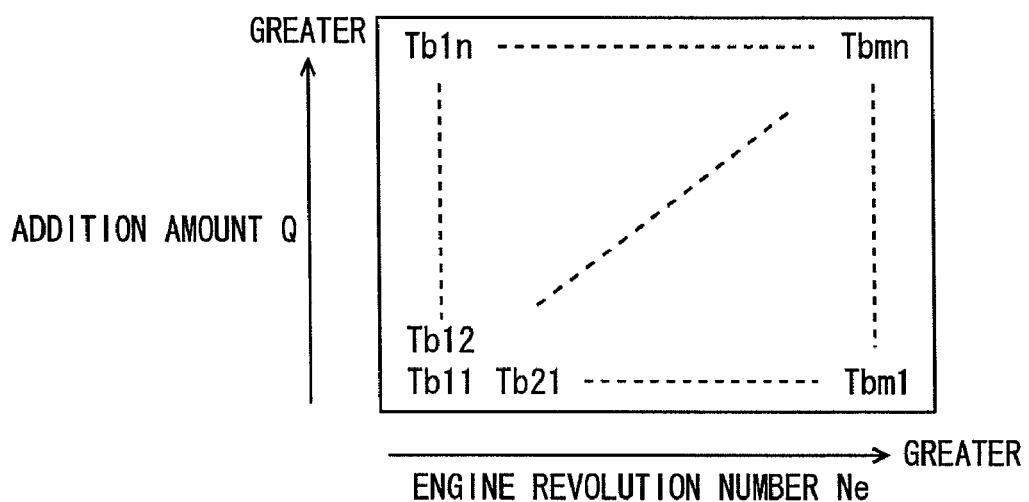
FIG. 4 shows a basic addition interval calculation map used for the addition interval correction process of FIG. 3.
Figure 7:
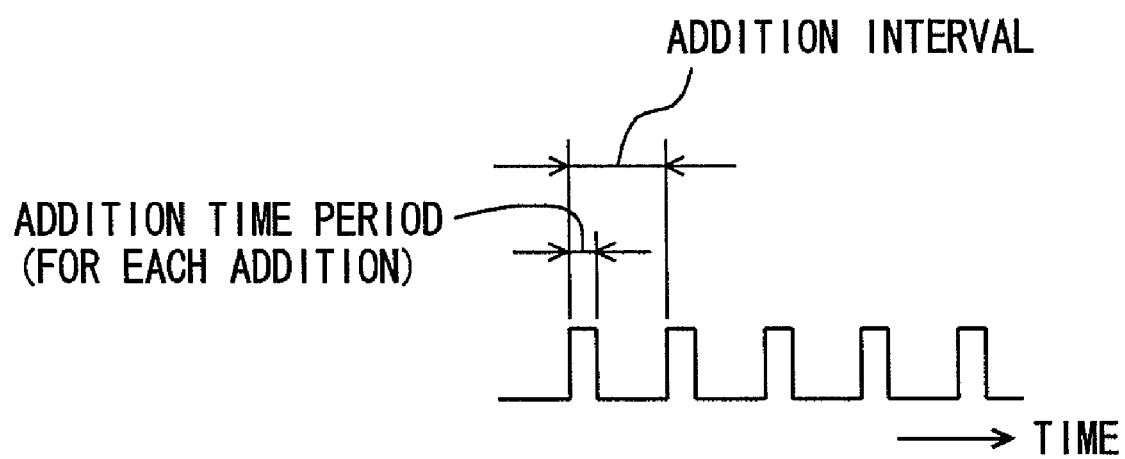
FIG. 7 shows a fuel addition interval and a fuel addition time period.

In step ST2, a basic addition interval Tb (see FIG. 7) of the fuel is calculated with reference to a map of FIG. 4 based on required addition amount Q and engine revolution number Ne. The basic addition interval calculation map is prepared by mapping the relation between basic addition interval Tb and both required addition amount Q and engine revolution number Ne determined beforehand through experiments and calculations, and the map is stored beforehand in ROM 102 of ECU 100. Further, in step ST2, a basic exhaust gas temperature (an ambient temperature of fuel addition valve 25) when basic addition interval Tb is calculated is obtained.

Figure 5:
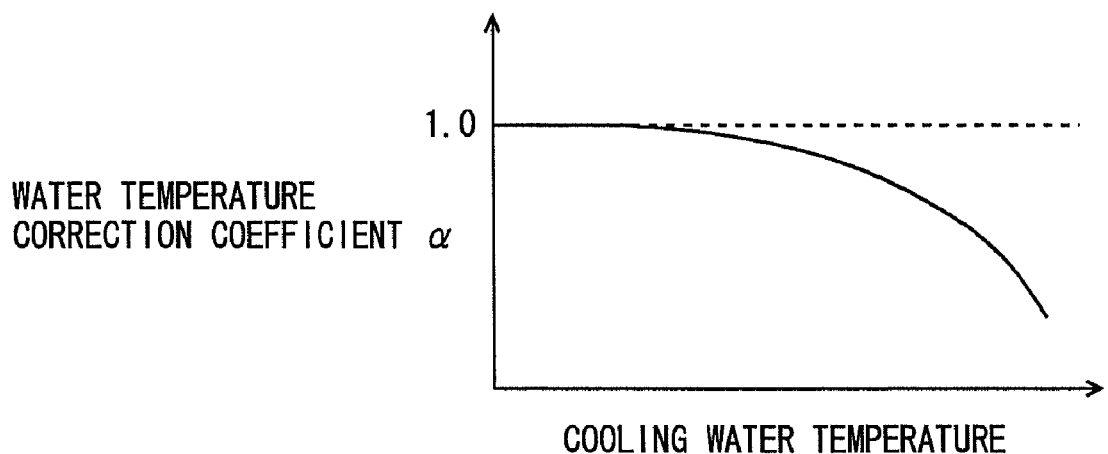
FIG. 5 shows a water temperature correction coefficient map used for the addition interval correction process of FIG. 3.

In step ST3, a cooling water temperature is read from an output of water temperature sensor 31, and a water temperature correction coefficient $\alpha$ is calculated with reference to a map of FIG. 5 based on the cooling water temperature. The water temperature correction coefficient map is prepared by mapping the relation between the cooling water temperature and water temperature correction coefficient $\alpha$ determined beforehand through experiments and calculations, and the map is stored beforehand in ROM 102 of ECU 100.

Figure 6:
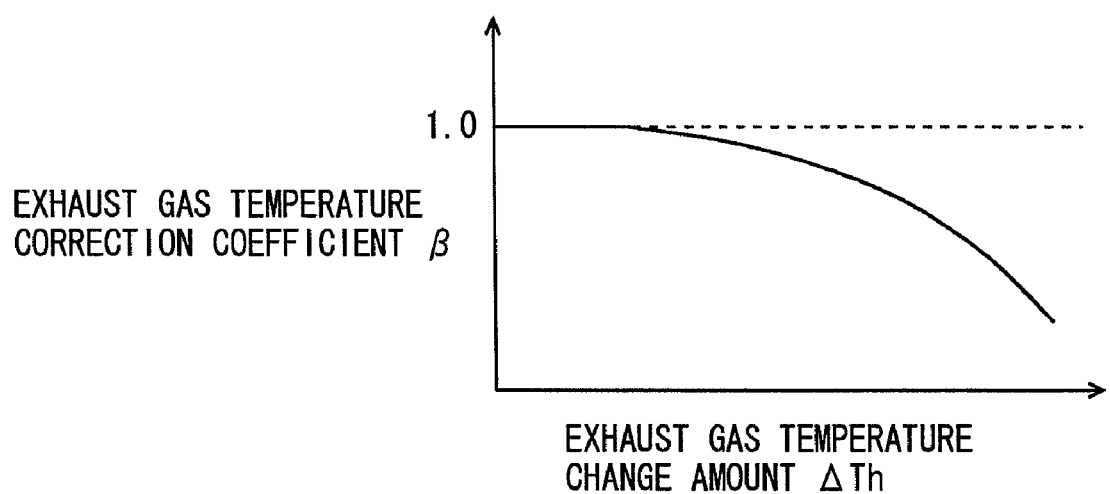
FIG. 6 shows an exhaust gas temperature correction coefficient map used for the addition interval correction process of FIG. 3.

In step ST4, an exhaust gas temperature correction coefficient $\beta$ is calculated with reference to a map of FIG. 6 based on a difference between the basic exhaust gas temperature obtained in step ST2 and an exhaust gas temperature at present (an exhaust gas temperature change amount $\Delta$Th). The exhaust gas temperature correction coefficient map is prepared by mapping the relation between exhaust gas temperature change amount $\Delta$Th and exhaust gas temperature correction coefficient $\beta$ determined beforehand through experiments and calculations, and the map is stored beforehand in ROM 102 of ECU 100. Exhaust gas temperature correction coefficient $\beta$ is set to be decreased with an increase in exhaust gas temperature change amount $\Delta$Th. Accordingly, the fuel addition interval is reduced with a decrease in exhaust gas temperature correction coefficient $\beta$.

The exhaust gas temperature (ambient temperature of fuel addition valve 25) may be calculated with reference to an exhaust gas temperature calculation map having parameters such as engine revolution number Ne, the intake air temperature, and the atmospheric pressure prepared through experiments and calculations and stored beforehand in ROM 102 of ECU 100. The exhaust gas temperature may also be obtained, for example, from an output of a sensor provided upstream of turbo charger 5 for detecting an exhaust gas temperature upstream of turbo charger 5.

Subsequently, in step ST5, a final addition interval is calculated based on an arithmetic expression [final addition interval=basic addition interval Tb×water temperature correction coefficient $\alpha$×exhaust gas temperature correction coefficient $\beta$], using basic addition interval Tb, water temperature correction coefficient $\alpha$, and exhaust gas temperature correction coefficient $\beta$ calculated as described above, and the routine is terminated.

According to the addition interval correction process described above, the fuel addition interval is corrected, based on an amount of change between the exhaust gas temperature at present and the basic exhaust gas temperature obtained when the basic addition interval is set, to be reduced with an increase in the amount of change in the exhaust gas temperature. Accordingly, when the exhaust gas temperature is increased in a highland region or the like, the fuel addition interval is corrected to be reduced and the fuel addition amount is corrected to be increased according to the increase in the exhaust gas temperature. Thereby, an increase in the temperature at the tip portion of fuel addition valve 25 can be suppressed, and the temperature at the tip of fuel addition valve 25 can be maintained at not more than a predetermined value (i.e., a temperature at which production of the deposits can be suppressed). As a result, clogging of the ejection hole of fuel addition valve 25 with the deposits can be avoided.

Other Embodiments

In the above example, the fuel addition amount is corrected by multiplying basic addition interval Tb by exhaust gas temperature correction coefficient $\beta$. Alternatively, the fuel addition amount may be corrected to be increased by multiplying a basic addition time period for each addition (see FIG. 7) by the exhaust gas temperature correction coefficient. It is to be noted that, when the basic addition time period for each addition is corrected, the exhaust gas temperature correction coefficient is set to be increased with an increase in exhaust gas temperature change amount $\Delta$Th.

While the above example describes a case where the exhaust gas purification device of the present invention is applied to an in-cylinder direct injection four-cylinder diesel engine, the present invention is not limited thereto, and is applicable for example to a diesel engine with any other number of cylinders such as an in-cylinder direct injection six-cylinder diesel engine. Further, in addition to an in-cylinder direct injection diesel engine, the present invention is also applicable to a diesel engine of any other type. Furthermore, the present invention is applicable not only to an engine for a vehicle but also to an engine used for any other application.

While the above example describes a case where catalyst device 4 includes NOx occlusion-reduction catalyst 4a and DPNR catalyst 4b, catalyst device 4 may include NOx occlusion-reduction catalyst 4a or an oxidation catalyst, and a DPF.

It should be understood that the embodiments herein disclosed are by way of illustration in all respects and not to be taken by way of limitation. The scope of the present invention is defined not by the above description but by the appended claims, and is intended to include all the modifications within the meaning and the scope equivalent to those of the claims.

The invention claimed is:

1. An exhaust gas purification device having a catalyst provided in an exhaust path of an internal combustion engine and a fuel addition valve adding fuel to said exhaust path, comprising:
    an electronic control unit which estimates an exhaust gas temperature to be exhausted to said exhaust path, using an atmospheric pressure as a parameter,
    wherein the electronic control unit sets a basic addition amount of the fuel to be added to said exhaust path,
    wherein the electronic control unit corrects an addition amount of the fuel to be added to said exhaust path to increase said addition amount of the fuel with an increase in an amount of change in the exhaust gas temperature obtained by subtracting a basic exhaust gas temperature obtained upon said basic addition amount being set from an exhaust gas temperature at present estimated by the electronic control unit, and wherein the electronic control unit corrects an injection amount of the fuel to be injected to said exhaust path by multiplying at least one of a basic addition time interval and a basic addition time period by a correction coefficient according to said amount of change in the exhaust gas temperature.

2. The exhaust gas purification device according to claim 1, wherein the exhaust gas purification device is a particulate matter reduction system.

3. The exhaust gas purification device according to claim 2, wherein the exhaust gas purification device is provided in the exhaust path downstream from a nitrogen oxide occlusion catalyst.

4. The exhaust gas purification device according to claim 2, wherein the electronic control unit corrects the addition amount of the fuel to be added to said exhaust path so as to maintain a temperature at a tip of the fuel addition valve at not more than a predetermined temperature at which production of particulate matter deposits can be suppressed.

5. An exhaust gas purification device having a catalyst provided in an exhaust path of an internal combustion engine and a fuel addition valve adding fuel to said exhaust path, comprising:
an electronic control unit which estimates an exhaust gas temperature to be exhausted to said exhaust path, using an atmospheric pressure as a parameter,
wherein said electronic control unit controls said exhaust gas purification device,
wherein said electronic control unit sets a basic addition amount of the fuel to be added to said exhaust path, and corrects an addition amount of the fuel to be added to said exhaust path to increase said addition amount of the fuel with an increase in an amount of change in the exhaust gas temperature obtained by subtracting a basic exhaust gas temperature obtained upon said basic addition amount being set from an exhaust gas temperature at present estimated by said electronic control unit, and
wherein said electronic control unit corrects an injection amount of the fuel to be injected to said exhaust path by multiplying at least one of a basic addition time interval and a basic addition time period by a correction coefficient according to said amount of change in the exhaust gas temperature.

6. An exhaust gas purification device having a catalyst provided in an exhaust path of an internal combustion engine and a fuel addition valve adding fuel to said exhaust path, comprising:
an electronic control unit which estimates an exhaust gas temperature to be exhausted to said exhaust path, using an atmospheric pressure as a parameter,
wherein the electronic control unit sets a basic addition amount of the fuel to be added to said exhaust path,
wherein the electronic control unit corrects an addition amount of the fuel to be added to said exhaust path to increase said addition amount of the fuel with an increase in an amount of change in the exhaust gas temperature obtained by subtracting a basic exhaust gas temperature obtained upon said basic addition amount being set from an exhaust gas temperature at present estimated by the electronic control unit, and
wherein the electronic control unit corrects the addition amount of the fuel to be added to said exhaust path to increase said addition amount of the fuel with an increase in an amount of change, in a positive direction, in the exhaust gas temperature obtained.

* * * * *